United States Patent Office 3,376,490
Patented Apr. 2, 1968

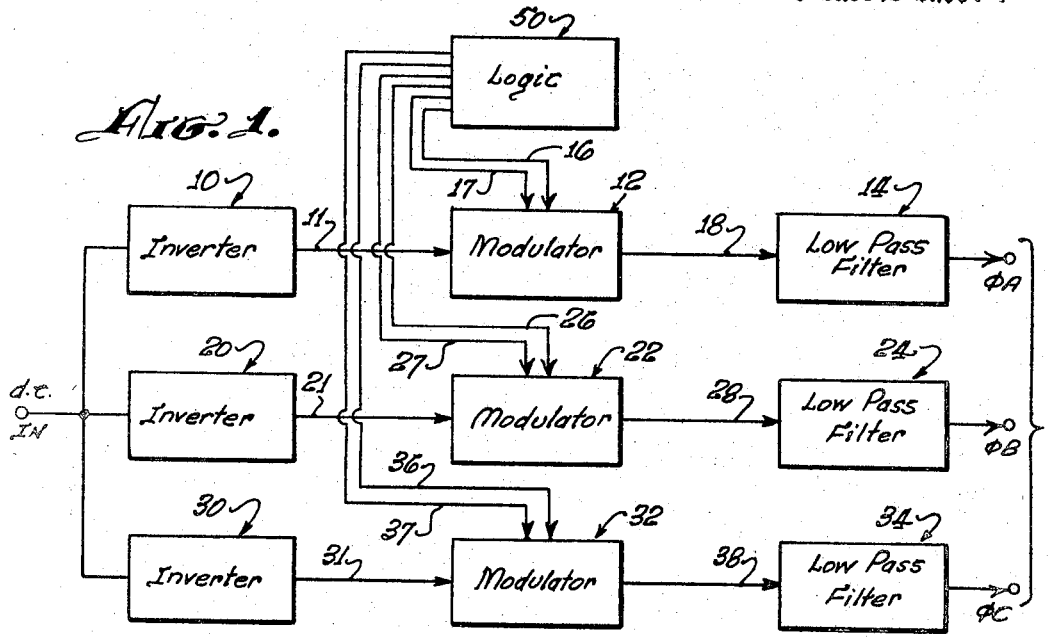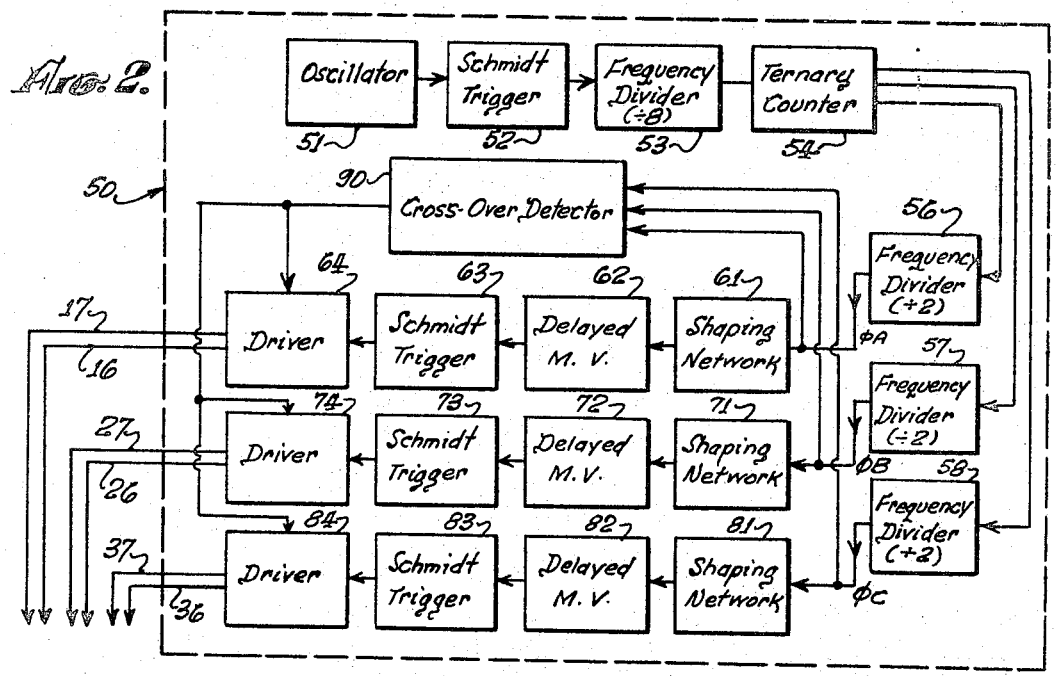

3,376,490
SYNTHESIZED WAVE STATIC INVERTERS
Fred S. Osugi, Alhambra, Calif., assignor to Electro-Optical System, Inc., Pasadena, Calif., a corporation of California
Filed Aug. 12, 1965, Ser. No. 479,073
5 Claims. (Cl. 321—5)

ABSTRACT OF THE DISCLOSURE

Synthesized output wave static inverter apparatus having an inverter for changing D.C. into an A.C. carrier at a frequency at least ten times the desired output wave frequency, signal generating means for generating a modulating signal composed of a recurring series of stretched waveform pulse trains having a minimum pulse frequency of at least about five times the output wave frequency, and means for modulating the A.C. carrier with the modulating signal, the thus modulated signal being fed to a low-pass filter having a cut-off at the lowest frequency of the pulses in the modulating signal.

Background of the invention

Much attention has been recently directed toward static inverter systems utilizing the wave synthesis technique in an effort to develop compact and light-weight apparatus for generating low frequency A.C. power for space vehicles and other applications wherein weight and space are at a premium. The bulk and weight of such inverter apparatus are determined primarily by the magnetic system components, i.e., transformers and filter reactors. By performing the D.C. to A.C. inversion at a frequency many times higher than the output or base frequency considerable savings in space and weight are effected, various of these high frequency A.C. signals then being combined in a certain manner to synthesize an output signal of the desired base frequency. The system output signal is shaped by filtration to form the desired low frequency sine wave. However, the present state-of-the-art static inverters of this type typically require output filtering designed for effectiveness at the low base frequency.

Summary of the invention

The present invention is directed toward a wave synthesis static inverter system technique wherein the output wave shape is synthesized in such a manner that the output filtering can be designed for effectiveness at frequencies many times higher than the base frequency. Therefore, the size and weight of the output filtering apparatus can be significantly reduced, to thereby provide an extremely compact and lightweight static inverter system characterized by high efficiency and reliability.

Accordingly, it is an object of the present invention to provide an improved static inverter system.

It is a further object of the present invention to provide extremely compact and lightweight static inverter systems.

It is another object of the present invention to provide extremely compact and lightweight static inverter systems characterized by high efficiency and reliability.

It is a still further object of the present invention to provide improved static inverter systems wherein the D.C. to A.C. inversion occurs at a frequency much higher than the output frequency.

It is yet another object of the present invention to provide a static inverter system wherein the output filtering occurs at a frequency much higher than the output frequency.

The objects of the present invention are accomplished by inverting D.C. to A.C. at a frequency at least ten times the output or base frequency to provide a high frequency carrier signal, modulating the carrier signal by a modulating signal composed of a recurring series of pulse trains, each of the pulse trains defining a stretched wave form beginning with pulses of high frequency and decreasing in frequency to about five times the base frequency and then increasing in frequency to end the train with high frequency pulses, the length of each of the pulse trains being equal to one-half the period of the base frequency, and feeding the thus modulated signal to low pass filter means designed for effectiveness at the lowest frequency of the pulses in the modulating signal.

The novel features which are believed to be characteristic of the invention, both as to its organization and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

Brief description of the drawing

FIGURE 1 is a block diagram of a three phase static inverter system utilizing the present invention technique;

FIGURE 2 is a block diagram showing in further detail the logic block of the diagram of FIGURE 1;

Description of the preferred embodiments

Figure 3:
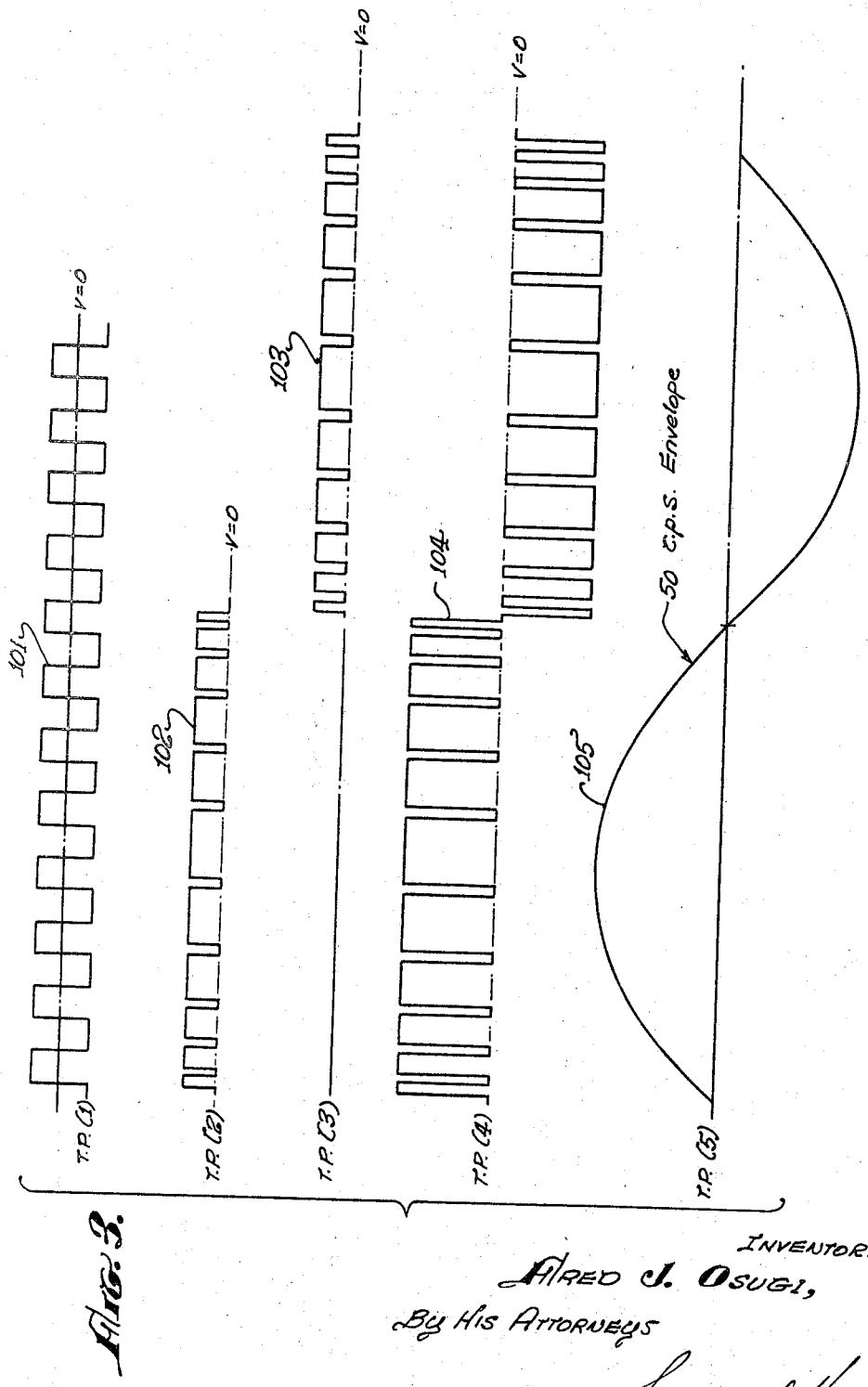
FIGURE 3 graphically illustrates various voltage relationships developed during operation of the present invention by plotting voltage magnitude as a function of time.

The present invention will be explained with reference to a three phase 50 cycle alternating current system, although it is understood that the present invention techniques are equally applicable to systems utilizing other base frequencies, such as 60 cycles and 400 cycles, for example.

Turning now to the drawing, in FIGURE 1 there is shown a block diagram of a three phase inverter system comprising three identical inverter channels for each of the phases A, B, and C. The inverter channel for the phase A consists of an inverter 10, a modulator 12, and a low pass filter 14, the inverter channel for phase B consisting of an inverter 20, a modulator 22 and a low pass filter 24, and the inverter channel for phase C consisting of an inverter 30, a modulator 32 and a low pass filter 34.

The D.C. input power is fed to each of the inverters 10, 20 and 30. The inverters function to generate carrier signals for each of the channels, the carrier signals being at a frequency at least 10 times the base frequency. Thus, in the illustrated embodiment wherein the base frequency is 50 cycles per second, the carrier frequency should be at least 500 cycles per second, with a frequency on the order of 2 kc. being presently preferred. The inverters function to switch the input D.C. at the carrier frequency rate to thereby provide a 2 kc. square wave carrier. The carrier pulse output for each of the inverter channels is fed to the modulator for that channel, as indicated by the respective arrow leads 11, 21 and 31. A typical 2 kc. inverter output is indicated by the wave form labelled 101 in FIGURE 3 of the drawing. Although the various wave forms depicted in FIGURE 3 are indicated as being drawn to the same time scale with reference to one cycle of the 50 c.p.s. output voltage, the number of pulses of the other wave forms have been intentionally reduced in number to facilitate depiction of the relationship between the high frequency pulses.

Stretched wave form modulation signals are produced by a logic system, generally indicated by the reference numeral 50, in FIGURE 2, in a manner to be hereinafter explained. The modulation signals for inverter channel A are fed to the modulator 12, as indicated by the arrow leads 16 and 17, the modulation signals for inverter channel B being indicated as fed to the modulator 22 by the arrow leads 26 and 27, and the modulation signals for inverter channel C being indicated as fed to the modulator 32 by the arrow leads 36 and 37. The relationship between the modulation signals fed through the leads 16 and 17 are shown in FIGURE 3 of the drawing, the modulation signal fed through the line 16 being indicated by the wave form labeled 102, the modulation signal fed through the lead 17 being indicated by the wave form labeled 103. The wave forms 102 and 103 are similar in character, except for being displaced by one-half cycle of the base frequency.

The stretched wave forms 102 and 103 comprise a series of pulses which begin with high frequency pulses and decrease in frequency to a much lower frequency and then again increase to high frequency pulses, whereby the central portion of each pulse train comprises lower frequency pulses to give rise to a higher integrated energy as compared with the beginning and end of the pulse train. The frequency of the pulses at the central portion of each pulse train is not critical, although it should be of a minimum frequency at least about five times the base frequency. There is no limitation on the frequency of the pulses at the beginning and end of each wave train. In the illustrated example wherein a 50 cycle output is utilized together with a 2 kc. carrier frequency, the pulse trains of the stretched wave forms 102 and 103 can typically vary between a high of 10 kc. and a low of 2 kc., this range being presently preferred in order to utilize readily available commercially produced components.

Each of the modulators is so constructed and arranged that its output polarity will be periodically reversed every half cycle of the base frequency. The output of the modulator 12, upon being fed the carrier signal 101 and the stretched wave form modulating signals 102 and 103, is shown by the wave form labeled 104 in FIGURE 3 that the positive portion of the modulator output is triggered by the modulating signal 102 and the negative portion of the modulator output triggered by the modulating signal 103. It is also apparent that the modulator output follows the pulse width characteristics of the modulation signals, the modulator performing a rectifying and gating process in which variable high frequency pulses are produced. These high frequency pulses are gated at the base frequency rate and then fed to a low pass filter to obtain the desired sinusoidal output.

Again referring to FIGURE 1 of the drawing, the output of the modulator 12 is fed to the low pass filter 14 as indicated by the arrow lead 18, the output of the modulator 22 being fed to the low pass filter 24 as indicated by the arrow lead 28, and the output of the modulator 32 being fed to the low pass filter 34 as indicated by the arrow lead 38. The low pass filters are of identical design and have a cut-off frequency equal to the frequency of lowest pulses in the pulse trains comprising the modulating signal, i.e. 2 kc. in the illustrated embodiment. Of course a lower frequency cut-off could be utilized down to the minimum of five times the carrier frequency, with a corresponding increase in size and weight of the filter reactors. Therefore, it is presently preferred to utilize the stated low frequency cut-off.

Upon passing through the low pass filter, which is of conventional design, the high frequency pulses will be synthesized into a 50 cycle sine wave, as indicated by the wave form labeled 105 in FIGURE 3 of the drawing. The process by which low frequency A.C. outputs are synthesized from high frequency pulses can be understood from an examination of the response of an ideal low pass filter to a rectangular pulse, in the manner disclosed on page 45 of the book entitled "Information Transmission Modulation and Noise," by Schwartz, published in 1959 by the McGraw-Hill Book Company. Some adjustment of the stretched wave form of the modulating signals may be necessary to achieve a substantially perfect sine wave output, and the manner of adjustment will become readily apparent upon reading the following description of suitable logic circuitry. It is readily apparent that a filter choke for use in a low pass filter having a 2 kc. cut-off will be significantly smaller and lighter than a filter choke designed for use in a 50 cycle filter. Using the present invention synthesis technique, unbalanced loads will have little effect on the change of phase shift of the 50 cycles per second fundamental through the low pass filters. For this reason, regulation of the line-to-neutral voltage of each phase will also result in good line-to-line regulation of the three phase output.

A block diagram of the presently preferred embodiment for the logic block 50 which produces the modulation signals is shown in FIGURE 2 of the drawing. An oscillator 51 is utilized to generate a 2,400 c.p.s. signal, a mechanically resonant type of oscillator being presently preferred. The 2,400 c.p.s. output of the oscillator 51 is squared through a Schmitt trigger 52, divided by eight in a frequency divider 53, and the resulting 300 c.p.s. signal is fed to a ternary counter 54. Each of the three outputs of the ternary counter is fed to a flip-flop binary frequency divider to thereby produce 50 c.p.s. phases (A, B, C) each separated by 120 degrees. More specifically, one output of the ternary counter 54 is fed through a frequency divider 56 to provide the 50 c.p.s. phase A, another output of the ternary counter 54 being fed through a frequency divider 57 to provide phase B, and the third output of the ternary counter 54 being fed through a frequency divider 58 to provide the phase C. The outputs of the binary dividers 56, 57 and 58 are square waves.

The phase A 50 c.p.s. output of the binary divider 56 is fed to a shaping net work 61 to produce a rectified sinusoid, the rectified sinusoid then being fed to a delayed multivibrator 62. The delayed multivibrator 62 is used to generate the variable high frequency pulses desired for the stretched pulse trains comprising the modulation signal. The resultant output of the delayed multivibrator 62 is squared by a Schmitt trigger 63 and then applied to a driver stage 64, which supplies the necessary modulation power. The modulation power for each of the other two phases is provided in an identical manner, the fifty cylcle phase B output of the binary divider 57 being fed successively through a shaping network 71, a delayed multivibrator 72, a Schmitt trigger 73 and a driver 74, the 50 cycle phase C output of the binary divider 58 being fed successively through a shaping network 81, a delayed multivibrator 82, a Schmitt trigger 83 and a driver 84.

A cross-over detector 90 is provided to sense when the signals applied to its input go from positive to negative. The output of each of the binary dividers 56, 57 and 58 are fed to the input of the cross-over detector. Thus, the input to the cross-over detector is a three phase, 50 c.p.s. square wave. The output of the cross-over detector 90 is fed to each of the drivers, 64, 74 and 84 so that the output of each driver can be shifted at the proper time between its two output leads to cause the desired polarity reversal of the modulator output, as will be hereinbelow explained.

Figure 4:
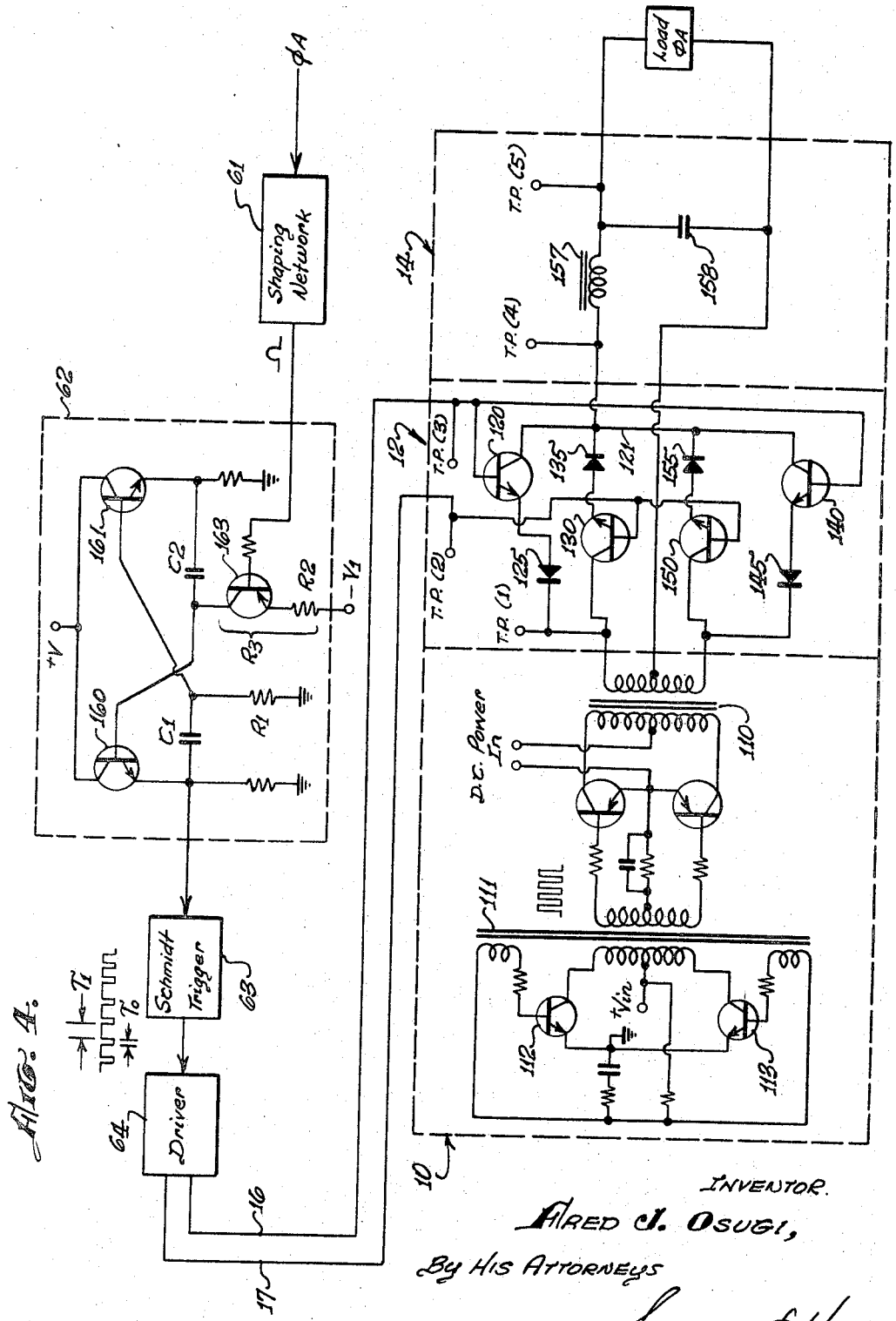
FIGURE 4 is a schematic diagram, partially in block form, of circuitry suitable for use in any one of the inverter channels of FIGURE 1.

Turning now to FIGURE 4 of the drawing there is shown a presently preferred circuitry suitable for use in various of the blocks of phase A in the diagrams of FIGURES 1 and 2. The inverter 10 is shown to be a transistor power inverter of the "driven" type wherein the drive is obtained from a separate oscillator. The inverter is a push-pull type which utilizes an unsaturating output transformer 110 and a saturating transformer 111. The saturating transformer 111 is constructed of a square hysteresis loop core material, and, together with two transistors 112 and 113 which are used as controlled switches, form the basis of this self-excited, push-pull oscillator. The transistors 112 and 113 conduct alternately to switch the input voltage, indicated $V_{in}$, across the transformer primary windings to cause the flux in the core to cycle between positive and negative saturation. When one of the transistors is switched into the saturated condition, its collector current rises linearly until the transformer 111 saturates. At core saturation the rate of change of flux, which has been relatively constant during linear collector current rise will be reduced suddenly, thereby causing the induced voltage. The sharpness of this change will depend on the squareness of the hysteresis loop. The decrease in induced drive voltages causes the ON transistor to come out of saturation and switch-off occurs. A small reverse change in flux causes a reversal of transformer voltages and serves to switch the other transistor on, thus completing the alternate half cycle.

The frequency of operation can be determined by selection of the magnetic core parameters, the primary turns and the input voltage. If the voltage drop across the transistor and winding resistance is assumed to be negligible, the frequency of operation will vary directly with the input voltage, $V_{in}$, and inversely with the number of transformer turns, maximum flux density, and transformer core cross-sectional area. This type of inverter is well known in the art and straightforward in design, and hence need not be described in further detail. The output of the inverter 10 appears across the secondary winding of the transformer 110 and is shown in FIGURE 3 of the drawing by the wave form 101, and is fed to the modulator 12.

The modulator 12 utilizes four transistors, 120, 130, 140 and 150 each of the transistors being shown as of the NPN type. The collectors of the transistors 130 and 150 are directly connected to opposite ends of the secondary winding of the transformer 110, the emitters of the transistors 120 and 140 being connected by respective diodes 125 and 145 to opposite ends of this secondary winding. The collectors of the transistors 120 and 140 are directly interconnected by an electrical lead 121, the emitters of the transistors 130 and 150 being connected to the lead 121 through respective diodes 135 and 155. The bases of the transistors 120 and 140 are connected to one output of the driver 64 by the electrical lead 16, the bases of the transistors 130 and 150 being connected to the other output of the driver 64 by the electrical lead 17. Various test points, respectively indicated as T.P.(1), T.P.(2), and T.P.(3), are shown for correlation with the wave forms 101, 102 and 103 of FIGURE 3.

The wave form at T.P.(1) is the 2 kc. square wave output of the inverter 10. On the positive half cycle of the desired 50 c.p.s. output the transistors 130 and 150 are driven into saturation by the modulation signals applied to their bases from one of the outputs of the driver 64. The resulting output which appears at T.P.(2) follows the pulse width characteristics of the modulation signal, as shown by the wave form 102 in FIGURE 3. The transistors, in essence, are in a full-wave rectifier configuration so that the transformer 110 operates at 2 kc. and does not "see" the 50 c.p.s. component of power. The negative half cycle of the 50 c.p.s. output is obtained in the same manner by application of the drive signal from the other output of the driver 64 to the bases of the transistors 120 and 140 to drive them into saturation. The output of the modulator 12 will appear at T.P.(4), and is shown by the wave form 104 in FIGURE 3.

The output of the modulator 12 is applied to the low pass filter 14, which consists of a series reactor 157 and a shunt capacitor 158, the low pass filter being of conventional design with a low-frequency cut-off of 2 kc. The low pass filter effectively filters the wave form 104 appearing at T.P.(4) into a 50 c.p.s. envelope, as indicated by the wave form 105 in FIGURE 3, appearing at T.P.(5). The generation of these 50 c.p.s. output signals for the other phases B and C occurs in an identical manner.

The schematic diagram of the delayed multivibrator 62 is also shown in FIGURE 4 of the drawing. The multivibrator utilizes two transistors 160 and 161, R-C intercoupled to form a multivibrator circuit. The emitter of transistor 160 is coupled by a capacitor $C_1$ to the base of the transistor 161, the emitter of the transistor 161 being coupled by a capacitor $C_2$ to the base of the transistor 160, to thereby provide the necessary feedback paths. The base of the transistor 161 is also coupled by a resistor $R_1$ to a point of common potential. The base of the transistor 160 is also connected to the collector of a triggering transistor 163, the base of which is resistively coupled to the output of the shaping network 61. The emitter of the triggering transistor 163 is coupled by a resistor $R_2$ to source of negative bias voltage, $V_1$.

An analysis of this circuit will show that the spacing between the output pulses of this multivibrator (indicated by $\tau_0$ for the output wave form shown in FIGURE 4) will be determined primarily by the product $R_1C_1$. The desired variable pulse width (indicated by $\tau_1$ in the output wave form of FIGURE 4) will be determined $C_2$ and $R_3$, $R_3$ being the resistance of the transistor 163 in series with $R_2$. Therefore, by controlling the base drive signal of the triggering transistor 163, the transistor resistance ($R_3$) and hence, the time $\tau_1$, can be controlled. The time $\tau_1$ will be variable since the drive signal from the shaping network 61 is a rectified sinusoid (as indicated by the input wave form shown in FIGURE 4). At the beginning of each input derived from the shaping network 61, the resistance $R_3$ is low, due to the conduction of the triggering transistor 163, and the multivibrator 62 operates at a high frequency, on the order of 10 kc. As the base input voltage to the triggering transistor 163 increases, current flow that transistor will be reduced, thereby increasing the resistance $R_3$ and lowering the frequency of operation of the multivibrator 62. At the peak of the input pulse applied to the base of the transistor 163, the resistance $R_3$ will be at its highest value, the multivibrator then operating at a frequency of about 2 kc. Then, as the input voltage decreases in accordance with the decreasing latter part of the rectified sinusoid input, the resistance $R_3$ decreases, thereby again increasing the frequency of multivibrator operation. Thus, it is apparent that by altering the configuration of the shaping network, various rates of change of multivibrator output frequency can be achieved. Thus, the configuration of the shaping network 61 can be adjusted to provide the best sine wave system output.

It will become apparent from a study of the various figures of the drawing that regulation may be obtained by sampling of the output, comparing the output with a stable reference voltage, and feeding the resultant error signal to the control circuitry of the delayed multivibrator. The control circuitry of the multivibrator will vary the duration of its variable high frequency output pulses, thereby resulting in voltage regulation. This regulation technique can be applied to each phase. Suggested circuitry for performing this technique is to sample the inverter output by a transformer-rectifier and apply it to a different amplifier wherein it is compared to a stable Zener diode reference. The resulting error signal is then applied to an adding network which adds the error signal to the rectified sinusoid output of the shaping network. As a result the width of the high frequency pulses generated by the delayed multivibrator will vary. As the pulse durations decrease, the sinusoidal channel output voltage will decrease. As pulse durations increase, the output voltage increases. This will occur, since for a fixed low pass filter, the smaller the pulse width the lower the voltage at the output of the filter. Thus, the regulator will cause higher frequency pulses to be generated by the delayed multivibrator (lower pulse widths) to correct for excessive inverter output voltage, and vice-versa.

Thus, there has been described a novel static inverter system utilizing the wave synthesis technique, wherein both the inversion and output filtering is performed at a frequency many times higher than the output frequency, thereby enabling significant reductions in system size and weight. Although the inverter has been described with reference to a 3-phase system, it is to be understood that the present invention technique is equally applicable to a single phase or other multi-phase systems. Hence, although the present inventtion has been described with a certain degree of particularity, it is understood that the present disclosure has been made only by way of example and that numerous changes in circuitry details and the combination and arrangement of parts may be resorted to without departing from the spirit and the scope of the invention as hereinafter claimed.

I claim:
1. In a static inverter system for converting electricity from a direct current source into alternating current electricity of a predetermined output frequency:
(a) an inverter channel for connection to said D.C. source, said channel including inverter means for generating an A.C. voltage of symmetrical waveshape and predetermined carrier frequency at least ten times said output frequency, said channel also including modulator means having a carrier pulse input and a modulating signal input, the carrier pulse input of said modulator means being coupled to the output of said inverter means, the electrical output of said modulator means being periodically reversed in polarity every half cycle of said output frequency, said channel further including low pass filter means having an input coupled to the output of said modulator means and having a low frequency cut-off at least about five times said output frequency; and
(b) signal generating means for producing a modulating signal composed of a recurring series of pulse trains, each of said pulse trains comprising a series of pulses of varying frequency beginning with pulses of high frequency and decreasing in frequency to not less than about five times said output frequency and then increasing in frequency to end with high frequency pulses, the length of each of said pulse trains being equal to one-half the period of said output frequency, the output of said signal generating means being coupled to the modulating signal input of said modulator means.

2. A multi-channel static inverter system for converting electricity from a direct current source into polyphase alternating current electricity of a predetermined output phase relationship and of a predetermined output frequency, comprising:
(a) at least first and second single-phase inverter channels for connection to said D.C. source, each of said channels including inverter means for generating an A.C. voltage of symmetrical waveshape and predetermined carrier frequency at least ten times said output frequency, each of said channels also including modulator means having a carrier pulse input and a modulating signal input, the carrier pulse input of each of said modulator means being coupled to the output of the inverter means for that channel, the electrical output of the modulator means for each of said channels being periodically reversed in polarity every half cycle of said output frequency, each of said channels further including low pass filter means having an input coupled to the output of the modulator means for that channel and having a low frequency cut-off at least about five times said output frequency;
(b) signal generating means for producing a modulating signal composed of a recurring series of pulse trains, each of said pulse trains comprising a series of pulses of varying frequency beginning with pulses of high frequency and decreasing in frequency to not less than about five times said output frequency and then increasing in frequency to end with high frequency pulses, the length of each of said pulse trains being equal to one-half the period of said output frequency, the output of said signal generating means being coupled to the modulating signal input of each of said modulator means;
(c) output terminals; and
(d) output phasing means intercoupling the outputs of the low pass filter means of the channels with said output terminals in said predetermined output phase relationship.

3. The apparatus defined in claim 2, wherein said signal generating means comprises oscillator means for generating electrical signals of said output frequency, waveshaping means for each of said channels coupled to the output of said oscillator means for producing electrical outputs consisting of rectified sinusoids of said output frequency, and delayed multivibrator means for each of said channels, each of said delayed multivibrator means having a variable output frequency determined by the instantaneous magnitude of the rectified sinusoid output of the waveshaping means for that channel.

4. The apparatus defined in claim 2, wherein said signal generating means comprises oscillator means for generating electrical pulses of a frequency which is a predetermined multiple of said output frequency, pulse counting means having an input coupled to the output of said oscillator and having an output for each of said channels, each of the outputs of said pulse counting means providing an output determined by a different pulse count than its other outputs, waveshaping means for each of said channels for producing electrical outputs consisting of rectified sinusoids of said output frequency, each of said waveshaping means being coupled to a different output of said pulse counting means, and delayed multivibrator means for each of said channels, the delayed multivibrator means for each of said channels being coupled to the waveshaping means for that channel and having a variable output frequency determined by the instantaneous magnitude of the rectified sinusoid output of the waveshaping means.

5. A multi-channel static inverter system for converting electricity from a direct current source into polyphase alternating current electricity of a predetermined output phase relationship and of a predetermined output frequency, comprising:
(a) at least first and second single-phase inverter channels for connection to said D.C. source, each of said channels including inverter means for generating an A.C. voltage of symmetrical waveshape and predetermined carrier frequency at least ten times said output frequency, each of said channels also including modulator means having a carrier pulse input and a modulating signal input, the carrier pulse input of each of said modulator means being coupled to the output of the inverter means for that channel, each of said modulator means including a plurality of electrical translating elements intercoupled in a full wave rectifier configuration for periodic reversal of the polarity of the electrical output of the modulator means every half cycle of said output frequency in accordance with the length of the pulse trains fed to its carrier pulse input, each of said channels further including low pass filter means having an input coupled to the output of the modulator means for that channel and having a low frequency cut-off not less than about five times said output frequency;

(b) signal generating means for producing a modulating signal composed of a recurring series of pulse trains, each of said pulse trains comprising a series of pulses of varying frequency beginning with pulses of high frequency and decreasing in frequency to not less than about five times said output frequency and then increasing in frequency to end with high frequency pulses, the length of each of said pulse trains being equal to one-half the period of said output frequency, the output of said signal generating means being coupled to the modulating signal input of each of said modulator means;

(c) output terminals; and (d) output phasing means intercoupling the outputs of the low pass filter means of the channels with said output terminals in said predetermined output phase relationship.

References Cited

UNITED STATES PATENTS

| | | | |
|---|---|---|---|
| 3,321,693 | 5/1967 | Heinrich et al. | 321—5 |
| 3,324,376 | 6/1967 | Hunt | 321—9 |
| 3,334,292 | 8/1967 | King et al. | 321—45 |
| 2,899,572 | 8/1959 | Skelton et al. | |
| 3,177,420 | 4/1965 | Barber et al. | 321—5 |
| 3,246,231 | 4/1966 | Clarke | 321—61 |

FOREIGN PATENTS 1,379,336  10/1964  France.

OTHER REFERENCES

Turnbull: "Selected Harmonic Reduction in Static D.C.–A.C. Inverters," IEEE Transactions, July 1964, pp. 374–378.

JOHN F. COUCH, *Primary Examiner.*

W. H. BEHA, *Assistant Examiner.*